Dec. 29, 1925.
L. JOHNSON
UNIVERSAL COUPLING
Filed Sept. 12, 1924   2 Sheets-Sheet 1
1,567,057
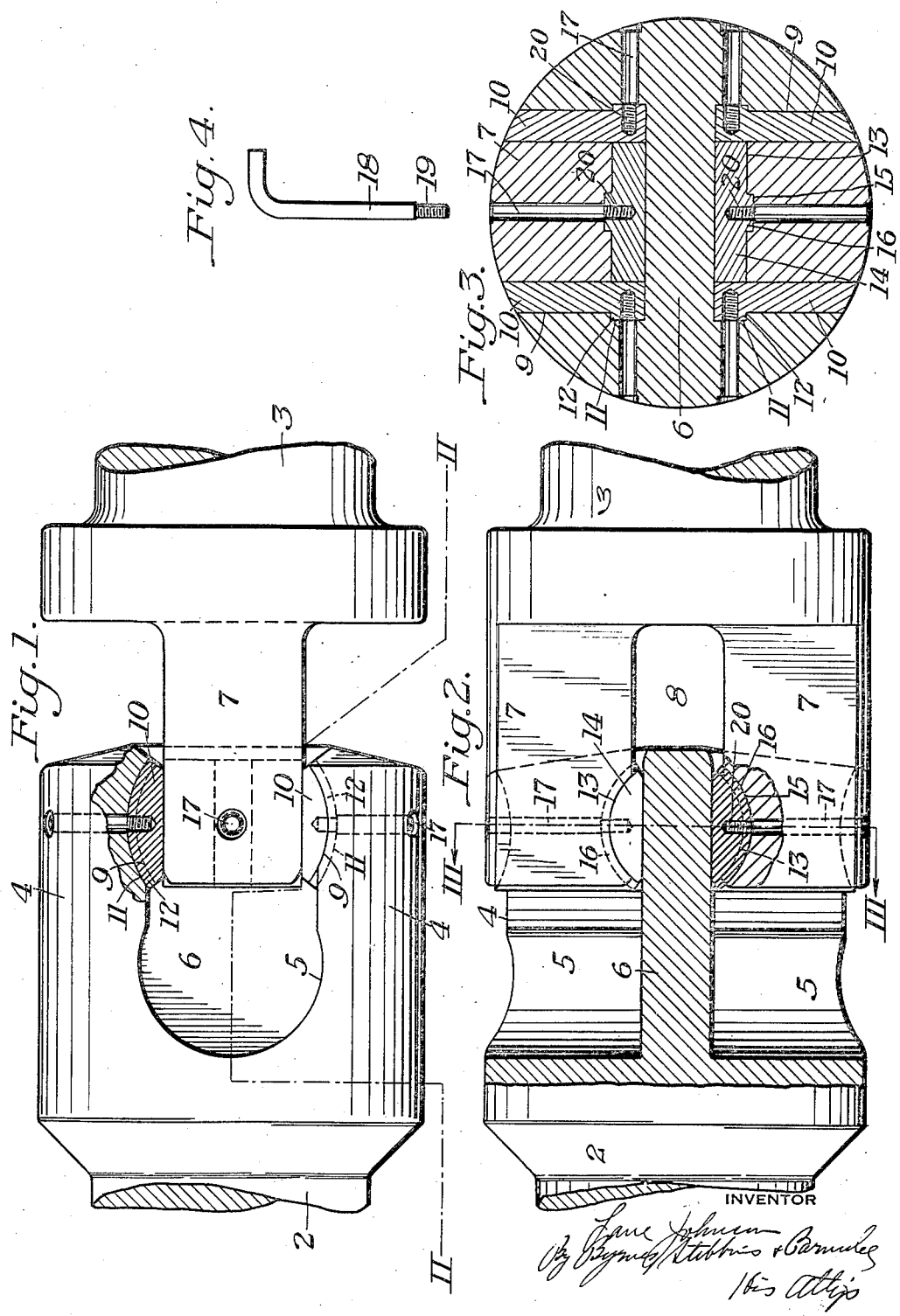

Dec. 29, 1925.

L. JOHNSON

UNIVERSAL COUPLING

Filed Sept. 12, 1924

INVENTOR

Patented Dec. 29, 1925.

1,567,057

UNITED STATES PATENT OFFICE.

LANE JOHNSON, OF PITTSBURGH, PENNSYLVANIA, ASSIGNOR TO UNITED ENGINEERING AND FOUNDRY COMPANY, OF PITTSBURGH, PENNSYLVANIA, A CORPORATION OF PENNSYLVANIA.

UNIVERSAL COUPLING.

Application filed September 12, 1924. Serial No. 737,276.

*To all whom it may concern:*

Be it known that I, LANE JOHNSON, a citizen of the United States, residing at Pittsburgh, in the county of Allegheny and State of Pennsylvania, have invented a new and useful Improvement in Universal Couplings, of which the following in a full, clear, and exact description, reference being had to the accompanying drawings, forming part of this specification.

The present invention relates to universal couplings, and particularly to the universal couplings between the ends of the spindle and the pinion and roll neck of a rolling mill.

The object of the invention is to provide an improved universal coupling between one end of the spindle and the pinion, whereby the spindle may be shifted axially to uncouple it from the roll neck. It has been proposed to accomplish this result in a universal coupling construction of the general type shown in the patent to Geer No. 1,041,773, for example, by lengthening the slot in the female portion of the coupling and correspondingly lengthening the tongue of the male portion of the coupling to permit the spindle to be moved axially towards the pinion far enough to entirely separate the opposite end of the spindle from the roll neck. A serious objection to this modified form of coupling, however, is that the lengthening of the slot in the female portion of the coupling lengthens the projecting arms of such portion to such an extent that they are liable to breakage in use by reason of the increased torsional leverage which the male end of the coupling exerts on such arms. By the present invention, I overcome this difficulty by providing a coupling in which the arms of the female portion of the coupling are strengthened by an integral connecting web extending substantially the full length of the arms. This web is received in the slot in the tongue of the male portion of the coupling, whereby relative transverse movement between the ends of the coupling is prevented. The arms of the female end of the coupling are provided with slippers, as usual, for co-operation with the slotted tongue, to permit relative angular movements between the coupled members in one plane; and the opposed interior faces of the slotted tongue have journaled therein additional slippers for sliding engagement with the web, and which permit relative angular movements between the coupled members in a plane at right angles to said first mentioned plane. A further advantage of my invention is that it provides a coupling which is substantially free from noise or chattering when in operation.

In the accompanying drawings wherein I have illustrated a preferred embodiment of the invention:

Figure 1 is a view showing two rotary members broken away and having their ends connected by a coupling constructed in accordance with the present invention, the coupling being shown partly in section;

Figure 2 is a view similar to Figure 1, showing the coupling partly in section, the section being taken approximately along the line II—II of Figure 1;

Figure 3 is a transverse section through the coupling on the line III—III of Figure 2;

Figure 4 is a detail view of one of the assembly screws; and

Figure 5:
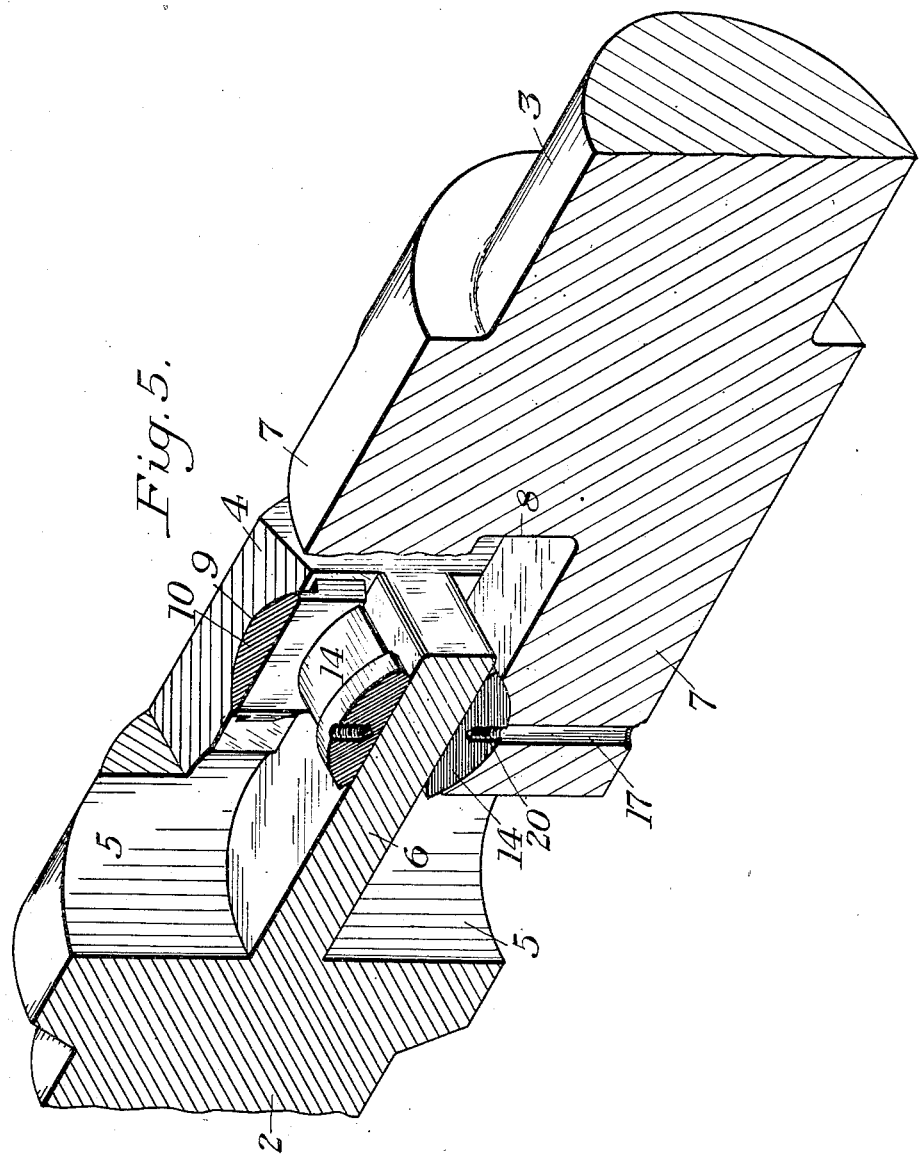
Figure 5 is a view partly in perspective and partly in section of the coupling.

Referring now to the details of construction, the reference numerals 2 and 3 designate, respectively, broken away portions of two rotary members which may be a rolling mill spindle on the one hand and either a pinion or a roll on the other hand. The member 2 has its end portion bifurcated, providing spaced arms 4. The slot 5 between these arms is intersected by a web 6, integral with the arms and extending substantially the full length thereof.

The member 3 is provided with a slotted tongue 7, adapted to be received in the slot 5 between the arms 4 and adapted to receive the web 6 in the slot 8 therein. The normal relative positions of the arms 4 and the tongue 7 when the coupling is operatively assembled are shown in Figures 1, 2 and 5. It will be apparent that the slots 5 and 8 are extended considerably beyond the extent required for this normal operative assembly of the coupling. The purpose of this is to permit sufficient relative axial movement of the rotary members 2 and 3 towards each other to permit one of said rotary members to be uncoupled at its opposite end from another rotary member. For example, if 2 represents a rolling mill spindle and 3 a pinion, the construction of the coupling would permit the spindle to be shifted axially towards the pinion a sufficient distance to uncouple the opposite end of the spindle from the roll neck. The opposite interior faces of the arms 4 have segmental cylindrical recesses 9 therein adjacent their outer ends, in which are journaled slippers 10 having flat faces for sliding engagement with the tongue 7.

The recesses 9 have depressed portions 11, to receive ribs 12 on the slippers 10, whereby the slippers are held against longitudinal movement when the coupling is assembled. The opposite interior faces of the tongue 7 have similar segmental cylindrical recesses 13 therein, in which are journaled slippers 14 having flat faces for sliding engagement with the web 6. The recesses 13 have central depressed portions 15 receiving central ribs 16 on the slippers 14, whereby the latter are prevented from moving longitudinally when the coupling is operatively assembled.

It will be apparent that this construction permits relative angular movement between the rotary members 2 and 3 in two planes at right angles to each other, thus providing a universal joint between the coupled members.

In order to facilitate the assembly of the slippers, I provide the arms 4 and the tongue 7 with transversely extending bores 17, adapted to receive assembly screws 18. These screws have screw-threaded end portions 19, adapted to be screwed into screw-threaded sockets 20, in the slippers, whereby the slippers are held in position in their recesses in the arms 4 and in the tongue 7 until the tongue 7 is positioned between the arms 4, as illustrated in Figures 1, 2 and 5. After the members 2 and 3 have been coupled in this manner, the assembly screws may be removed, thereby permitting the slippers to function. When the members 2 and 3 are to be uncoupled, the assembly screws may again be inserted in the bores 17 and screwed into the sockets 20 to hold the slippers from falling out after the tongue 7 has been disengaged from the arms 4. These screws will also hold the slippers from turning relatively to each other after the members 2 and 3 have been uncoupled, so that the opposed faces of the slippers will remain in parallelism. This greatly facilitates the coupling of the members because it obviates the necessity of any relative adjustment of the slippers to bring their opposed faces into parallelism as would be necessary if some means were not provided for preventing relative turning movement between the slippers.

While I have described my invention as being particularly applicable for coupling the end of a rolling mill spindle to a pinion, it will be apparent that the invention is equally applicable for coupling the end of the spindle to the roll neck or for coupling any two rotary members where it is desired to provide for a relative axial movement between the members. Furthermore, the invention is not limited to the exact details of construction shown, but may be otherwise embodied within the scope of the appended claims.

I claim:

1. In a coupling, a rotary member having a bifurcated end, the arms of which are connected by an integral web, and a second rotary member having a slotted tongue adapted to be received between said arms and adapted to receive said web in the slot thereof, said arms and said slot being of greater length than required for normal operating assembly of the coupling to permit relative axial movement of said members towards each other for uncoupling one of said members from another member, substantially as described.

2. In a coupling, a rotary member having a bifurcated end, the arms of which are connected by an integral web, and a second rotary member having a slotted tongue adapted to be received between said arms and adapted to receive said web in the slot thereof, said arms and said slot being of greater length than required for normal operating assembly of the coupling to permit relative axial movement of said members towards each other for uncoupling one of said members from another member, said coupling embodying means permitting universal movement between said members, substantially as described.

3. In a coupling, a rotary member having a bifurcated end, the arms of which are connected by an integral web extending substantially the full length thereof, and a second rotary member having a slotted tongue adapted to be received between said arms and adapted to receive said web in the slot thereof, said arms and said slot being of greater length than required for normal operating assembly of the coupling to permit relative axial movement of said members towards each other for uncoupling one of said members from another member, substantially as described.

4. In a coupling, a rotary member having a bifurcated end, the arms of which are connected by an integral web extending substantially the full length thereof, and a second rotary member having a slotted tongue adapted to be received between said arms and adapted to receive said web in the slot thereof, said arms and said slot being of greater length than required for normal operating assembly of the coupling to permit relative axial movement of said members towards each other for uncoupling one of said members from another member, said coupling embodying means permitting universal movement between said members, substantially as described.

5. In a coupling, a rotary member having a bifurcated end, the arms of which are connected by an integral web, a second rotary member having a slotted tongue adapted to be received between said arms and adapted to receive said web in the slot thereof, and slippers journaled in recesses in the opposed interior faces of said arms and arranged for sliding engagement with said tongue, said arms and said slot being of greater length than required for normal operating assembly of the coupling to permit relative axial movement of said members towards each other for uncoupling one of said members from another member, substantially as described.

6. In a coupling, a rotary member having a bifurcated end, the arms of which are connected by an integral web, a second rotary member having a slotted tongue adapted to be received between said arms and adapted to receive said web in the slot thereof, slippers journaled in recesses in the opposed interior faces of said arms and arranged for sliding engagement with said tongue, and slippers journaled in recesses in the opposed interior faces of said tongue and arranged for sliding engagement with said web, said arms and said slot being of greater length than required for normal operating assembly of the coupling to permit relative axial movement of said members towards each other for uncoupling one of said members from another member, substantially as described.

7. In a coupling, a rotary member having a bifurcated end, the arms of which are connected by an integral web, a second rotary member having a slotted tongue adapted to be received between said arms and adapted to receive said web in the slot thereof, slippers, journaled in recesses in the opposed interior faces of said arms and arranged for sliding engagement with said tongue, slippers journaled in recesses in the opposed interior faces of said tongue and arranged for sliding engagement with said web, and means whereby said slippers may be held in said recesses with their opposed faces in parallel relation when said members are uncoupled, said arms and said slot being of greater length than required for normal operating assembly of the coupling to permit relative axial movement of said members towards each other for uncoupling one of said members from another member, substantially as described.

In testimony whereof I have hereunto set my hand.

LANE JOHNSON.